United States Patent [19]

Clark et al.

[11] 4,019,523
[45] Apr. 26, 1977

[54] METHOD AND APPARATUS FOR MIXING GASES

[76] Inventors: Justin S. Clark, 720 E. 3120 South, Salt Lake City, Utah 84106; Wm. Dean Wallace, 408 Second Ave., Salt Lake City, Utah 84103

[22] Filed: Feb. 7, 1975

[21] Appl. No.: 547,856

[52] U.S. Cl. .................................. 137/7; 137/607; 137/624.2
[51] Int. Cl.² ........................................ G05D 11/13
[58] Field of Search ............... 137/7, 111, 505.19, 137/606, 607, 624.2

[56] References Cited
UNITED STATES PATENTS

| | | | |
|---|---|---|---|
| 1,218,543 | 3/1917 | Gattermeir | 137/505.19 |
| 3,717,177 | 2/1973 | Glesmann | 137/607 |
| 3,749,111 | 7/1973 | Dobritz | 137/111 X |
| 3,762,427 | 10/1973 | Mollering | 137/7 |
| 3,830,256 | 8/1974 | Cox | 137/606 X |
| 3,886,971 | 6/1975 | Lundsgaard et al. | 137/606 X |
| 3,895,642 | 7/1975 | Bird et al. | 137/7 |
| 3,905,384 | 9/1975 | Berger | 137/606 X |

Primary Examiner—Alan Cohan
Assistant Examiner—Gerald A. Michalsky
Attorney, Agent, or Firm—B. Deon Criddle

[57] ABSTRACT

A method of accurately mixing gases in desired proportions which comprises establishing the gases to be mixed at a uniform pressure; sequentially feeding the gases through a common restrictor for proportionate time periods to give the gas mix desired. The apparatus used includes an isobaric gas reservoir unit which adjusts all gases to be mixed to have a common pressure; electronically actuated rapid response fluidic interface valves; a common restrictor through which the gases are passed to a rceiving and mixing chamber; and timing means controlling the valves to allow gases to be sequentially passed therethrough for pre-set time periods

4 Claims, 2 Drawing Figures

METHOD AND APPARATUS FOR MIXING GASES

BRIEF DESCRIPTION OF THE INVENTION

1. Field of the Invention

This invention relates to methods and apparatus for mixing diverse gases in closely regulated proportions. It finds use in those operations where precise measurements and control of gas mixtures are critical to system success. For example, it has been found that by establishing gas mixes providing the same concentration of gases, i.e. $O_2$ or $CO_2$ in the mix as is measured in a blood sample and by using the measured gas concentrations of the mix as a basis for percent gas determination, errors resulting from direct reading or from defective readings of the gas directly from a blood sample can be largely avoided. A relatively simple and low cost gas mixer has great practical application in research laboratories, pulmonary function laboratories and in other areas.

2. Prior Art

Various methods of mixing gases in predetermined ratios have been proposed in the past. The most accurate previously known gas mixers known to applicants are mechanical piston type devices that offer fixed gas ratios that are determined by the choosing of various piston-gearing combinations. There has also been available a mixer which operates by combining fixed flows of several gases. The individual gas flows are maintained constant by providing accurately regulated pressure sources and by providing constant flow limiters for each gas. This device has a fixed mixing ratio.

In connection with the determination of gas concentrations in blood it has also been proposed that diverse gases be mixed in proportions corresponding to the proportions of the gases determined by electrodes to be present in a blood sample. The gases to be mixed are in separate reservoirs and are regulated to be at the same pressure. The samples are equilibrated with water vapor at a known temperature. The gases, under pressure, are then sequentially allowed to flow through a restrictor and a control valve to a mixing chamber. The restrictors through which each of the gases pass are adjusted to give equal flow therethrough and the control valve is operated to allow flow from each reservoir for time periods proportionate to stored signals originally generated by the gas sensing electrodes when the electrodes were measuring the gases in the blood sample. The same electrodes measure the gas mix and generate a signal that can be compared against the stored signal as an accuracy check and when the signals are matched the gas ratios in the mix and the sample are the same. Since the volumes of gases in the mix can be readily calculated from the time of flow of the gas through the control valve, the concentration of each gas in the mix can be readily determined. While the described system may be entirely satisfactory for many purposes, the accuracy of the system is dependent upon the accuracy with which the gases are mixed. This, in turn, is dependent upon the ability to maintain the gas reservoir pressures equal and the ability to control flow through the restrictors at the outlets of the reservoirs.

OBJECTS OF THE INVENTION

Principal objects of the present invention are to provide a gas mixing system wherein diverse gases can be mixed in desired proportions with greater accuracy than has been achieved using other known systems, and wherein such accuracy can be achieved at a relatively low cost when compared with other available regulatory systems.

Other objects are to provide a gas mixing system wherein the gases are balanced against each other to provide a uniform pressure and are fed through a common restrictor so that equal flows are obtained without the need for temperature or water vapor controls.

Still other objects are to provide a gas mixer that will allow for continued varying of the gas fractions of a mix, and a unit that is readily calibrated for use with any gas.

FEATURES OF THE INVENTION

Principal features of the invention include an isobaric balancing system wherein diverse gases are balanced against one another to insure that the gas pressures and temperatures are uniform, a common restrictor through which the gases are passed to a mixing chamber and a timed signal generator that will operate a control valve to sequentially or on demand allow flow of the gases to the mixing chamber to achieve a desired gas mix.

Other objects and features of the invention will become apparent from the following detailed description, taken together with the accompanying drawing.

THE DRAWING

In the drawing:

FIG. 1 is a schematic diagram of a gas mixing apparatus of the present invention; and FIG. 2 is a schematic diagram of the apparatus used to calibrate the system.

DETAILED DESCRIPTION

Figure 1:
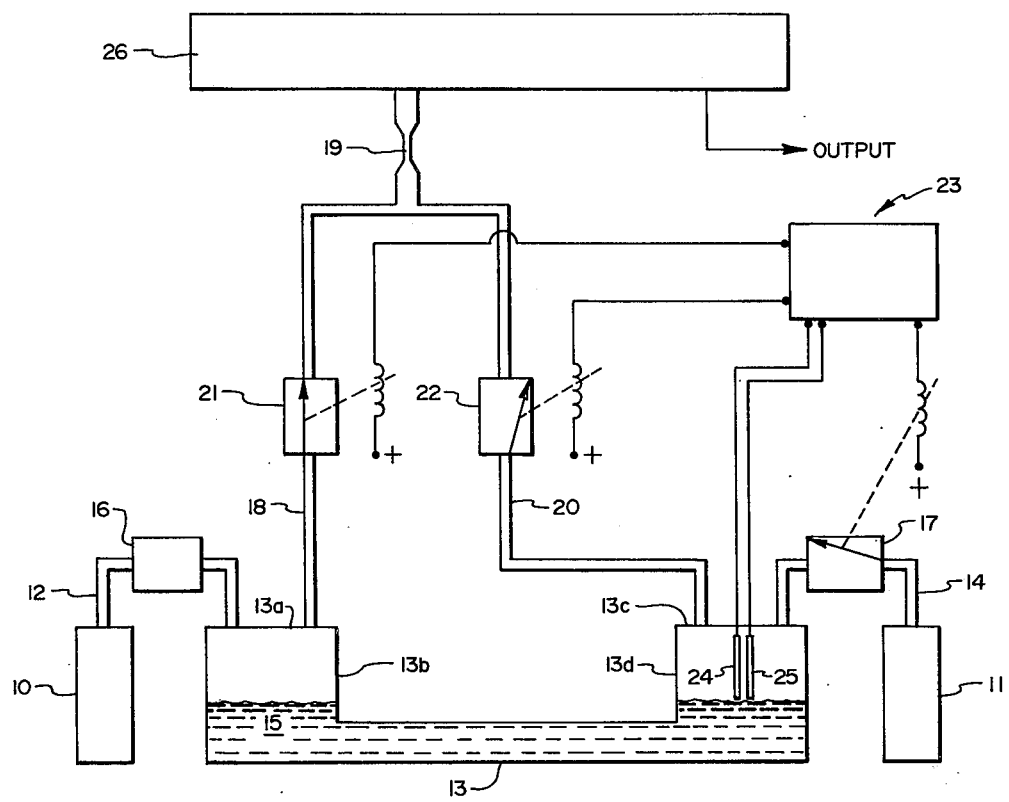

Referring now to the drawing:

In the illustrated preferred embodiment of the invention as shown in FIG. 1, reservoirs 10 and 11 are each provided to contain a gas under pressure and the diverse gases contained therein are hereafter identified as gas 10 and gas 11. These gases, may be, for example, oxygen and nitrogen respectively or can be any other gases that it may be desired to mix. As will become apparent any number of gases can be mixed merely by expanding the system to accommodate the number used.

Reservoir 10 is connected by a conduit 12 to the upper end 13a of an upstanding leg 13b of a receptacle 13 and reservoir 11 is similarly connected by a conduit 14 to the upper end 13c of an upstanding leg 13d of the receptacle.

Water 15 in the receptacle 13 fills the lower portion of the receptacle and stands in both legs 13b and 13d when the pressures in the legs, above the water is equal.

A pressure regulating valve 16 is provided in conduit 12 and a refill valve 17 is provided to control flow through conduit 14.

A conduit 18 interconnects the upper end 13a of leg 13b of receptacle 13 to the inlet side of a restrictor 19 and a conduit 20 similarly connects the upper end 13c of the leg 13d to the inlet side of the restrictor.

Valves 21 and 22 are respectively provided in the conduits 18 and 20 to control flow therethrough. The valves 17, 21 and 22 are all solenoid valves and the valves 21 and 22 are arranged such that when one is open to allow flow therethrough, the other is closed to prevent flow therethrough.

The solenoid valves are controlled through conventional-type circuitry, shown in block diagram form at 23. The circuitry 23 also includes a pair of level sensing probes 24 and 25 that extend into the reservoir to the level reached by the water 15 in leg 13d when the pressures are equalized in legs 13b and 13d.

The outlet of restrictor 19 is connected to a mixing chamber 26.

In operation, pressure regulating valve 16 is set at a desired downstream pressure and gas 10 is allowed to flow therethrough until the pressure in the upper portion of leg 13b is at that set into the pressure regulating valve.

If the pressure of the gas 10 acting on the column of water 15 in leg 13b is above the pressure of gas 11 acting on the column of water in leg 13d the level of water in 13b will drop and that in leg 13d will rise. However, as soon as the level in leg 13d rises to the ends of the electrodes 24 and 25 circuit 23 operates to open the valve 17 and to allow flow of gas 11 to the upper end 13c of leg 13d. Valve 17 remains open until the water 15 no longer completes the circuit across electrodes 24 and 25, i.e. until the pressures in legs 13b and 13d above the water 15 are equalized.

Circuit 23 also includes means for generating control signals to the solenoid valves 21 and 22 and for varying the control signals to each valve according to the length of time the valve is to be opened to permit flow therethrough. Thus, if it were desired to have a gas mixture made up of 50% gas 10 and 50% gas 11, the control signals would provide for sequential opening of valves 21 and 22, with each valve being opened for the time necessary to obtain the 50/50 mix. If the gases have the same viscosity and density the valves 21 and 22 would be opened for equal time periods to give the 50/50 mix. If gases of different viscosity and density are mixed it will be necessary to calculate the different times the valves are to be opened, as will be hereinafter further explained. Since the gas pressures of gases 10 and 11 are essentially equal, and since the gases are directed through the same restrictor, it will be apparent that the volume of each gas passed through the restrictor is a direct function of time and that the concentrations of gases in the mix are therefore proportionate to the time periods the valves 21 and 22 are opened, when corrected for flow changes resulting from different viscosities and densities of the gases.

If, when valve 21 opened, the pressure at 13a should start to decrease, pressure regulating valve 16 will open to re-establish the desired pressure. Similarly, if valve 21 is closed and valve 22 is opened to allow flow therethrough and the pressure at 13c should start to drop the water level in leg 13d will rise to complete the circuit across electrodes 24 and 25. This will cause a signal to open valve 17 until the pressure balance is again established and the level of water 15 is just below the electrodes 24 and 25.

Figure 2:
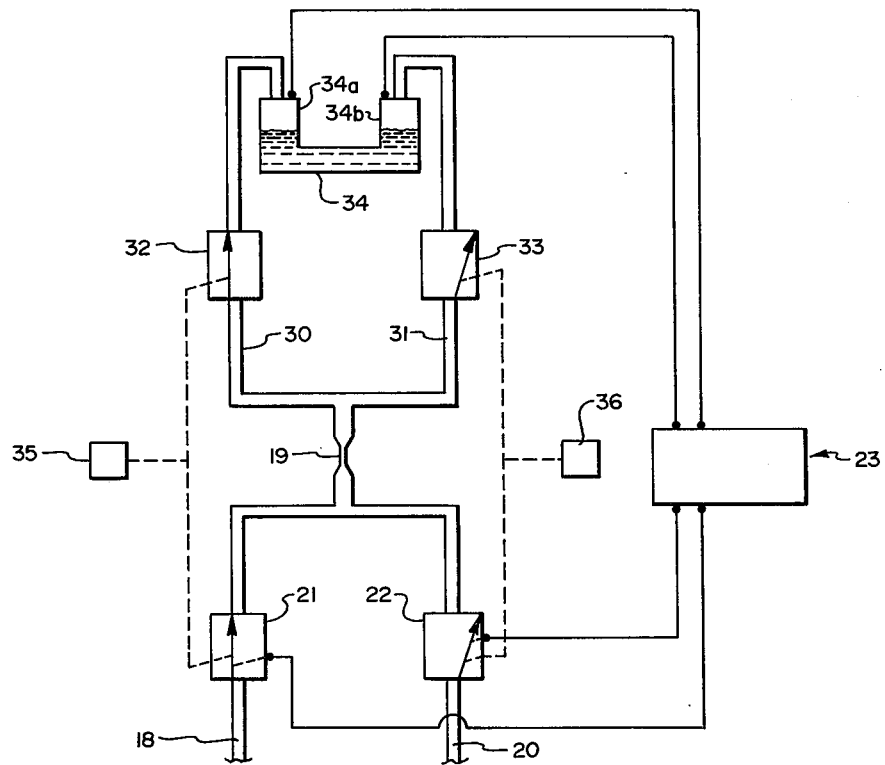

In order to correct for flow changes resulting from different viscosities and densities of the gases a constant value for each gas is determined. This is easily done by connecting the flows through the restrictor to valve controlled divided calibration conduits and then into another isobaric apparatus. Thus as shown in FIG. 2, during calibration, the gas leaving restrictor 19 goes either to conduit 30 or to conduit 31. A valve 32 in line 30 is ganged to valve 21 and a similar valve 33 is ganged to valve 22 so that the valves 21 and 32 are simultaneously opened and closed and the valves 22 and 33 are simultaneously opened and closed.

The circuit 23 includes means for sensing differential pressure in the legs 34a and 34b of the isobaric apparatus 34 and, whenever the pressure is higher in leg 34a than in leg 34b, the valve 21 and ganged valve 32 is closed and valve 22 is opened along with its ganged valve 33. Conversely, a higher pressure in leg 34b will close valves 22 and 33 and will open valves 21 and 32. Counters 35 and 36 are respectively provided to monitor opening and closing of the valves.

Pulse signals generated in circuit 23 attempt to sequentially open each valve 21 and 22 in turn for equal time periods. If however, the valve is held closed by a high pressure in its associated leg of the isobaric apparatus 34 (the legs being of equal volume), no opening will be counted. The ratio of flow for the gases is then determined by the number of opening counts recorded for each of the valves 21 and 22. The same system can be used to determine the ratios of more than two gases, merely by expanding the system to include other conduits, isobaric apparatus legs, valves and counters.

If desired the volumes of the divided gases can also be measured by conventional methods to determine the flow ratio.

Knowing the flow ratios it is easily possible to calculate the time each valve 21 and 22 must be opened to give a desired gas mix in the mixing chamber 26 of FIG. 1.

Although a preferred form of our invention has been herein disclosed, it is to be understood that the present disclosure is made by way of example and that variations are possible without departing from the scope of the hereinafter claimed subject matter, which subject matter we regard as our invention.

We claim:
1. A method of mixing gases, which comprise the steps of
   a. balancing the pressures of gases to be mixed against one another until the gases are all at the same pressure;
   b. sequentially flowing the gases through a common restrictor while maintaining the pressures in a balanced condition; and
   c. regulating the flow of each gas through the restrictor to a mixing chamber according to a time that is proportionate to the desired concentration of the gas in the mixing chamber and flow ratios of the gases.

2. A method of mixing gases as in claim 1, further including
   determining the flow ratios of the gases by determining the relative time each gas is flowed through the restrictor to maintain a pressure balanced condition of the gases in a receiving vessel downstream of the restrictor.

3. A method of mixing gases, which comprises the steps of
   a. individually supplying a gas to be mixed to one of a plurality of upstanding legs of a receptacle having fluid therein and extending upwardly into each leg;
   b. sensing the height of the fluid in the receptacle when said fluid is standing at the same height in each of the legs;
   c. regulating the flow of one gas into one leg of the receptacle in accordance with the pressure in the receptacle;

d. regulating flow of each other gas into a leg of the receptacle in accordance with the height of the fluid in the receptacle; and e. passing the gases sequentially through a restrictor and into a mixing chamber, with the time of flow of each gas through the restrictor being proportional to the concentration of said gas in the mix.

4. A method of mixing gases as in claim 3, further including determining the flow ratios of the gases by determining the relative time each gas is flowed through the restrictor to maintain a pressure balanced condition of the gases in a receiving vessel downstream of the restrictor.

* * * * *